(12) United States Patent
Miyaki (10) Patent No.: US 9,400,742 B2
(45) Date of Patent: Jul. 26, 2016

(54) STORAGE CONTROL DEVICE, STORAGE CONTROL METHOD AND PROGRAM

(71) Applicant: SUZUKI MOTOR CORPORATION, Hamamatsu-shi, Shizuoka (JP)

(72) Inventor: Tomohiko Miyaki, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 270 days.

(21) Appl. No.: 13/845,924

(22) Filed: Mar. 18, 2013

(65) Prior Publication Data

US 2013/0254468 A1 Sep. 26, 2013

(30) Foreign Application Priority Data

Mar. 23, 2012 (JP) ................................ 2012-067494

(51) Int. Cl.
| | |
|---|---|
| *G06F 12/00* | (2006.01) |
| *G06F 13/00* | (2006.01) |
| *G06F 13/28* | (2006.01) |
| *G06F 12/02* | (2006.01) |
| *F02D 41/04* | (2006.01) |
| *F02D 41/24* | (2006.01) |
| *F02B 61/04* | (2006.01) |

(52) U.S. Cl.
CPC .......... *G06F 12/0246* (2013.01); *F02D 41/042* (2013.01); *F02D 41/2406* (2013.01); *F02D 41/249* (2013.01); *F02B 61/045* (2013.01)

(58) Field of Classification Search
CPC .................................................. G06F 12/0246
See application file for complete search history.

(56) References Cited

U.S. PATENT DOCUMENTS

| | | | | | |
|---|---|---|---|---|---|
| 4,296,722 | A | * | 10/1981 | Furuhashi et al. | 123/492 |
| 4,364,343 | A | * | 12/1982 | Malik | 123/179.4 |
| 5,197,026 | A | * | 3/1993 | Butler | G11C 7/00 |
| | | | | | 365/185.08 |

(Continued)

FOREIGN PATENT DOCUMENTS

| | | |
|---|---|---|
| JP | H0610724 A | 1/1994 |
| JP | 2003-120412 A | 4/2003 |

(Continued)

OTHER PUBLICATIONS

Embedded Instruction Memory in Automotive Engine Controllers; Oved et al; IEEE Transactions on Vehicular Technology, vol. 52, No. 1, Jan. 2003 (11 pages).*

(Continued)

*Primary Examiner* — Sanjiv Shah
*Assistant Examiner* — Daniel C Chappell
(74) *Attorney, Agent, or Firm* — Troutman Sanders LLP (57) ABSTRACT

A storage control device of an outboard motor writing operation history information of the outboard motor to a nonvolatile memory by using an electric power generated by driving of an internal combustion engine, the storage control device includes a stop instruction detecting unit detecting a stop instruction of the driving of the internal combustion engine by a boat operator, a writing unit writing the operation history information to the nonvolatile memory in accordance with the stop instruction detected by the stop instruction detecting unit, a write judgment unit judging whether or not the operation history information is written to the nonvolatile memory by the writing unit, and a stop processing unit stopping the driving of the internal combustion engine after it is judged that the operation history information is written to the nonvolatile memory by the write judgment unit.

5 Claims, 5 Drawing Sheets

(56) References Cited

U.S. PATENT DOCUMENTS

| | | | | |
|---|---|---|---|---|
| 5,235,696 | A * | 8/1993 | Schaff | 711/202 |
| 5,596,512 | A * | 1/1997 | Wong | G01R 31/3648 |
| | | | | 307/66 |
| 5,852,998 | A * | 12/1998 | Yoshioka | 123/491 |
| 5,999,876 | A * | 12/1999 | Irons | F02D 41/263 |
| | | | | 701/115 |
| 6,009,372 | A * | 12/1999 | Baker et al. | 701/115 |
| 6,104,977 | A * | 8/2000 | Avery, Jr. | 701/101 |
| 6,115,666 | A * | 9/2000 | Ng | 701/115 |
| 6,347,276 | B1 * | 2/2002 | Avery, Jr. | F02D 41/042 |
| | | | | 701/112 |
| 6,367,022 | B1 * | 4/2002 | Gillespie | G06F 1/26 |
| | | | | 307/31 |
| 6,393,573 | B1 * | 5/2002 | Gillespie | G06F 1/3203 |
| | | | | 108/54.1 |
| 6,401,163 | B1 * | 6/2002 | Kondo et al. | 711/100 |
| 6,601,176 | B1 * | 7/2003 | Alexander | G06F 1/24 |
| | | | | 713/1 |
| 6,626,154 | B1 * | 9/2003 | Kanno | 123/486 |
| 6,732,285 | B1 * | 5/2004 | Sommer | G05B 19/0421 |
| | | | | 701/48 |
| 6,760,846 | B1 * | 7/2004 | Yoshida | G06F 1/26 |
| | | | | 713/300 |
| 6,848,427 | B2 * | 2/2005 | Song et al. | 123/486 |
| 6,923,047 | B2 * | 8/2005 | Miyaki | F02D 29/02 |
| | | | | 73/114.56 |
| 6,941,219 | B2 * | 9/2005 | Avery et al. | 701/115 |
| 7,275,515 | B2 * | 10/2007 | Ikoma | 123/305 |
| 7,562,650 | B2 * | 7/2009 | Tabata et al. | 123/491 |
| 8,265,860 | B2 * | 9/2012 | Ichinose et al. | 701/113 |
| 8,290,693 | B2 * | 10/2012 | Shoda et al. | 701/113 |
| 8,457,865 | B2 * | 6/2013 | Geyer | 701/104 |
| 2002/0169991 | A1 * | 11/2002 | Weinold | G06F 1/30 |
| | | | | 713/324 |
| 2003/0115940 | A1 * | 6/2003 | Miyaki et al. | 73/116 |
| 2004/0204800 | A1 * | 10/2004 | Honda | 701/1 |
| 2009/0093945 | A1 * | 4/2009 | Okumura | 701/103 |
| 2013/0191007 | A1 * | 7/2013 | Iino | 701/102 |
| 2014/0141663 | A1 * | 5/2014 | Kuriyagawa et al. | 440/1 |

FOREIGN PATENT DOCUMENTS

| | | | | |
|---|---|---|---|---|
| JP | 2003120412 | A | * | 4/2003 |
| JP | 2006-029303 | A | | 2/2006 |
| JP | 2006029303 | A | * | 2/2006 |

OTHER PUBLICATIONS

Internal combustion engine, New World Encyclopedia, Oct. 6, 2008, retrieved from https://web.archive.org/web/20081006153848/http://www.newworldencyclopedia.org/entry/Internal_combustion_engine on Feb. 5, 2015 (8 pages).*

Machine translation of JP 2006-029303, AIPN, retrieved Aug. 13, 2015 (22 pages).*

Machine translation of JP 2003-120412, AIPN, retrieved Feb. 5, 2015 (6 pages).*

Extended European Search Report, dated Jul. 29, 2013, which issued during the prosecution of European Patent Application No. 13156968.3.

Office Action having a mail date of Jun. 30, 2015, issued in corresponding Japanese Patent Application No. 2012-067494.

* cited by examiner

STORAGE CONTROL DEVICE, STORAGE CONTROL METHOD AND PROGRAM

CROSS-REFERENCE TO RELATED APPLICATIONS

This application is based upon and claims the benefit of priority of the prior Japanese Patent Application No. 2012-067494, filed on Mar. 23, 2012, the entire contents of which are incorporated herein by reference.

BACKGROUND OF THE INVENTION

1. Field of the Invention

The present invention relates to a storage control device, a storage control method and a program used for an outboard motor. Specifically, the present invention is suitable to be used when operation history information of an internal combustion engine of the outboard motor is written to a nonvolatile memory.

2. Description of the Related Art

Conventionally, an art is known in which operation history information of an internal combustion engine of an outboard motor is stored at a nonvolatile memory to be used as information for various diagnoses of the internal combustion engine. For example, in an operation state storage device disclosed in Patent Document 1, it is disclosed that information in which a time necessary to be a predetermined rotation number is added with correspond to a time range is stored at the nonvolatile memory in addition to engine rotation speed information, temperature information, and pressure information.

Generally, when the operation history information is stored in the outboard motor permanently providing a battery, it is possible to write the operation history information to the nonvolatile memory by receiving supply of an electric power from the battery even if an ignition switch is turned off.

Figure 5:
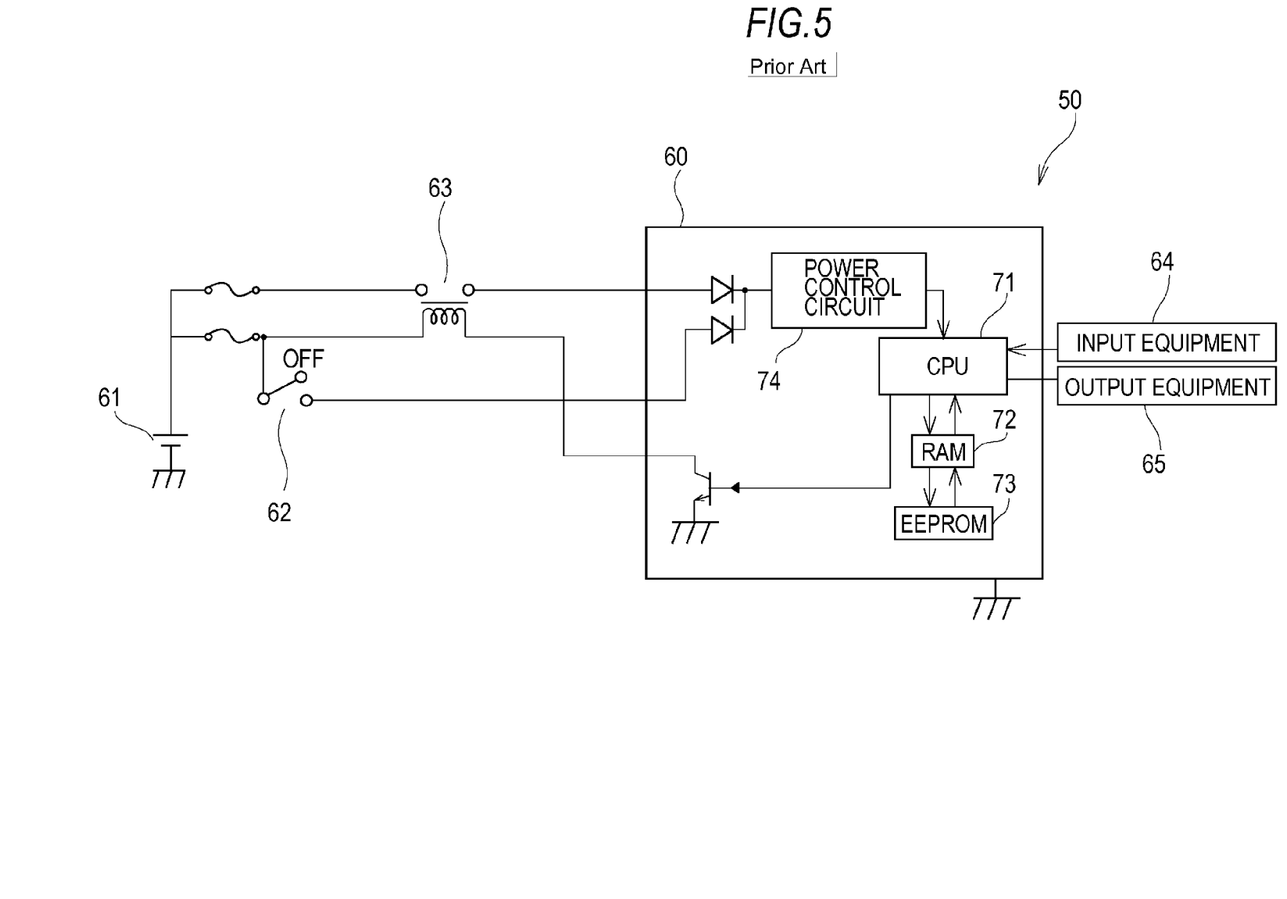
FIG. 5 is a block diagram illustrating a supposed internal configuration of an outboard motor where a battery is permanently provided.

It is concretely described with reference to a block diagram in FIG. 5 and a flowchart in FIG. 6. FIG. 5 is a block diagram illustrating an example of a supposed internal configuration of an outboard motor 50 permanently providing a battery. The outboard motor 50 includes an ECU 60, a battery 61, an ignition switch 62, a main relay 63, an input equipment 64, an output equipment 65, and so on. Besides, the ECU 60 is constituted by including a CPU 71, a RAM 72, an EEPROM 73, a power control circuit 74, and so on.

Figure 6:
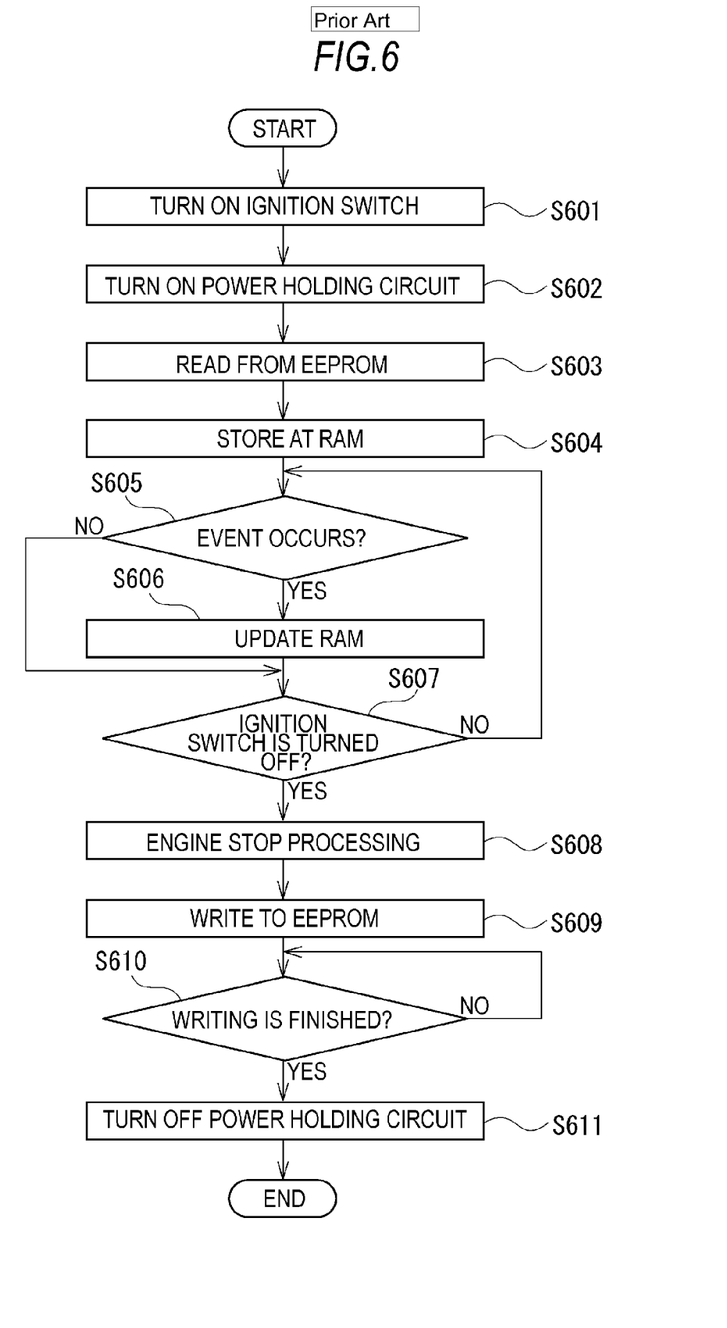
FIG. 6 is a flowchart illustrating supposed processes storing operation history information of the outboard motor where the battery is permanently provided at a nonvolatile memory.

FIG. 6 is the flowchart illustrating an example of supposed processes when the outboard motor 50 permanently providing the battery stores the operation history information at the EEPROM 73.

In step S601, a boat operator turns on the ignition switch 62, and thereby, an electric power passes through a path of the turned on ignition switch 62 and is supplied from the battery 61 to the CPU 71 via the power control circuit 74.

In step S602, the CPU 71 turns on the main relay 63 as a power holding circuit, and thereby, the electric power passes through a path of the turned on main relay 63 and is constantly supplied from the battery 61 to the CPU 71 via the power control circuit 74.

In step S603, the CPU 71 reads the operation history information already stored at the EEPROM 73. In step S604, the CPU 71 stores the read operation history information at the RAM 72. After that, the CPU 71 is able to drive an engine by driving a starter motor in accordance with a start instruction of the engine by, for example, the boat operator.

In step S605, the CPU 71 judges whether or not an event occurs, and updates the operation history information stored at the RAM 72 in step S606 when the event occurs.

In step S607, the CPU 71 judges whether or not the ignition switch 62 is turned off, and stops the engine in step S608 when the ignition switch 62 is turned off.

In step S609, the CPU 71 writes the operation history information stored at the RAM 72 to the EEPROM 73. At this time, the CPU 71 is able to perform the writing process of the operation history information to the EEPROM 73 even if the ignition switch 62 is turned off and the engine is stopped because the electric power is supplied from the battery 61 to the CPU 71 via the main relay 63 which is turned on.

In step S610, the CPU 71 judges whether or not the process writing the operation history information to the EEPROM 73 is finished, and turns off the main relay 63 in step S611 when it is finished to thereby complete the process storing the operation history information.

As stated above, in the outboard motor where the battery is permanently provided, it is possible for the CPU to perform the process writing the operation history information to the EEPROM by receiving the supply of the electric power from the battery even if the ignition switch is turned off and the engine is stopped. Namely, in the outboard motor where the battery is permanently provided, it is possible to store the operation history information until the engine stops at the EEPROM. Note that there is a limitation in the EEPROM in the number of writing times, and there is a case when, for example, hundreds of thousands of writings may deteriorate reliability, but the number of writing times to the EEPROM is reduced and the reliability of the writing can be secured by collectively writing the operation history information to the EEPROM by using the turning off of the ignition switch as a trigger as in the above-stated flowchart.

[Patent Document 1] Japanese Laid-open Patent Publication No. 2003-120412

However, for example, in a small-sized outboard motor, there is a batteryless outboard motor which does not include the battery. In the batteryless outboard motor as stated above, the CPU generally operates by driving an engine and receiving supply of generated electric power. Accordingly, the CPU is not able to operate after the engine is stopped, and therefore, there is a problem in which the operation history information cannot be written to the EEPROM.

For example, it is conceivable that the operation history information is constantly or regularly written to the EEPROM during the engine is driven to solve the problem as stated above. However, the number of writing times to the EEPROM increases to thereby exceed the limitation, and the write reliability is lowered if the writings are performed constantly or regularly. Besides, it is impossible to write the operation history information to the EEPROM from a final writing until the engine is stopped.

Besides, for example, it is conceivable to add a capacitor and so on to secure a power supply after the engine is stopped to correspond to the above-stated problem. However, there are problems in which it becomes a factor of cost increase of the outboard motor and it is difficult to secure a layout to dispose the capacitor.

SUMMARY OF THE INVENTION

The present invention was made in consideration of the above-described problems and has an object to provide a storage control device and so on capable of stably and surely storing operation history information at a nonvolatile memory even when an engine stop instruction is issued.

A storage control device according to the embodiment is a storage control device of an outboard motor writing operation history information of the outboard motor to a nonvolatile memory by using an electric power generated by driving of an internal combustion engine, the storage control device includes: a stop instruction detecting means detecting a stop instruction of the driving of the internal combustion engine by a boat operator; a writing means writing the operation history information to the nonvolatile memory in accordance with the stop instruction detected by the stop instruction detecting means; a write judgment means judging whether or not the operation history information is written to the nonvolatile memory by the writing means; and a stop processing means stopping the driving of the internal combustion engine after it is judged that the operation history information is written to the nonvolatile memory by the write judgment means.

A storage control method according to the embodiment is a storage control method of an outboard motor writing operation history information of the outboard motor to a nonvolatile memory by using an electric power generated by driving of an internal combustion engine, the storage control method includes: a stop instruction detecting step of detecting a stop instruction of the driving of the internal combustion engine by a boat operator; a writing step of writing the operation history information to the nonvolatile memory in accordance with the stop instruction detected by the stop instruction detecting step; a write judgment step of judging whether or not the operation history information is written to the nonvolatile memory by the writing step; and a stop processing step of stopping the driving of the internal combustion engine after it is judged that the operation history information is written to the nonvolatile memory by the write judgment step.

A program product according to the embodiment is a program product for causing a storage control device of an outboard motor writing operation history information of the outboard motor to a nonvolatile memory by using an electric power generated by driving of an internal combustion engine, to execute: a stop instruction detecting step of detecting a stop instruction of the driving of the internal combustion engine by a boat operator; a writing step of writing the operation history information to the nonvolatile memory in accordance with the stop instruction detected by the stop instruction detecting step; a write judgment step of judging whether or not the operation history information is written to the nonvolatile memory by the writing step; and a stop processing step of stopping the driving of the internal combustion engine after it is judged that the operation history information is written to the nonvolatile memory by the write judgment step.

DETAILED DESCRIPTION OF THE PREFERRED EMBODIMENTS

Hereinafter, an embodiment according to the present invention will be described with reference to the drawings.

Figure 1:
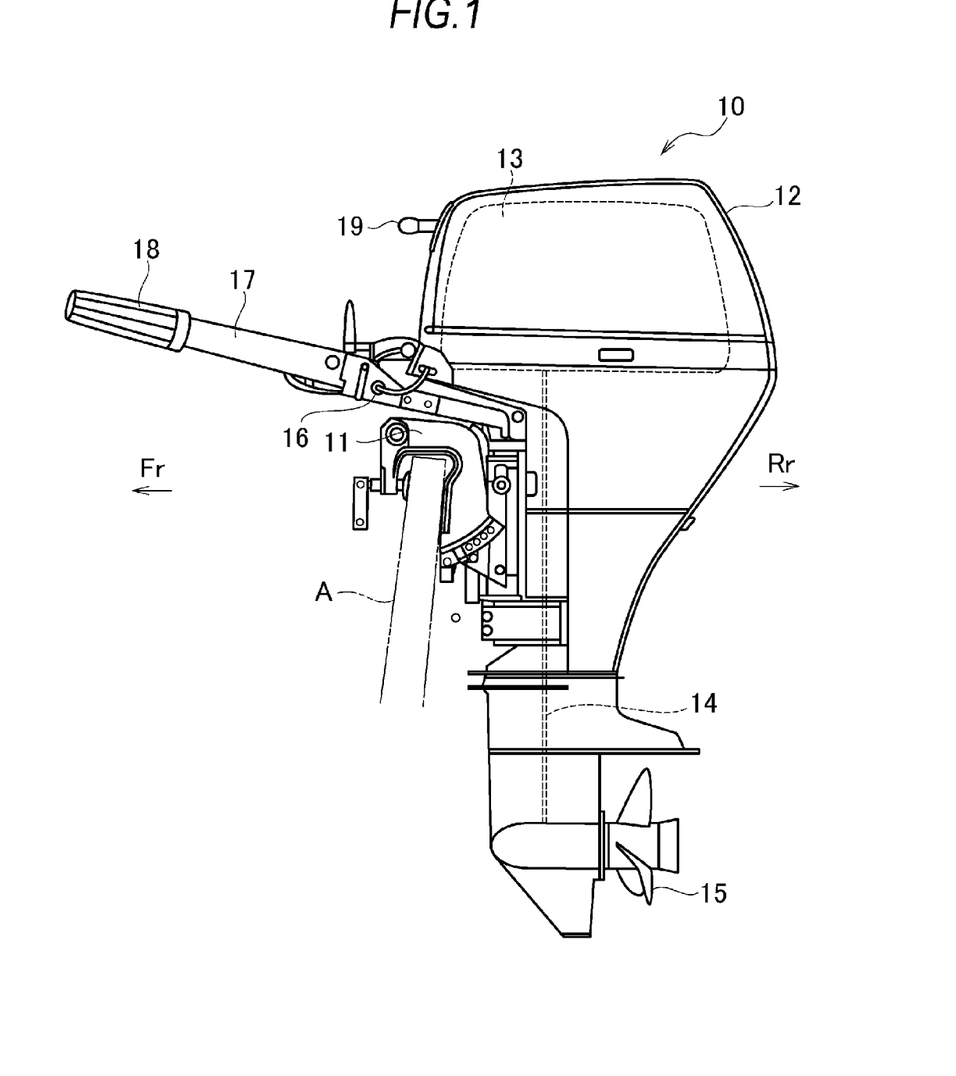
FIG. 1 is a view illustrating an example of an external appearance of an outboard motor according to an embodiment.

FIG. 1 is a view illustrating an example of an external appearance of an outboard motor 10. In FIG. 1, an arrow Fr indicates a front side (a forward direction of a hull where the outboard motor 10 is mounted) of the outboard motor 10, and an arrow Rr indicates a rear side (a backward direction of the hull where the outboard motor 10 is mounted) of the outboard motor 10.

The outboard motor 10 is mounted at a stern board A at the Rr side of the hull via a clamp bracket 11. A whole of the outboard motor 10 is covered with an exterior cover 12, and thereby, it is constituted while fixing a shape thereof. An engine 13 as an internal combustion engine for the outboard motor is housed in the exterior cover 12. The engine 13 rotates a screw 15 arranged at downward of the outboard motor 10 via a drive shaft 14, and thereby, the hull is driven.

A bar handle 17 extending toward the Fr side of the hull is provided at upward of the clamp bracket 11 via a handle bracket 16. A throttle grip 18 for controlling an accelerator is provided at a tip portion of the bar handle 17. A boat operator appropriately operates the throttle grip 18, and thereby, an opening degree adjustment of a not-illustrated throttle valve is performed, and thereby, engine power is controlled.

Besides, a later-described power generator generating electricity by driving of the engine 13, a later-described ECU (engine control unit) operating only by the electric power generated by the power generator, and so on are arranged in the exterior cover 12. Namely, the outboard motor 10 according to the present embodiment is so-called a batteryless outboard motor which does not include a battery. The boat operator performs a pulling operation of a starter knob 19 arranged at a front side of the exterior cover 12, rotates a crankshaft by a recoil starter to thereby drive the power generator, and electrical components of the outboard motor 10 are operated by using the electric power generated by the power generator to thereby start the engine 13.

Figure 2:
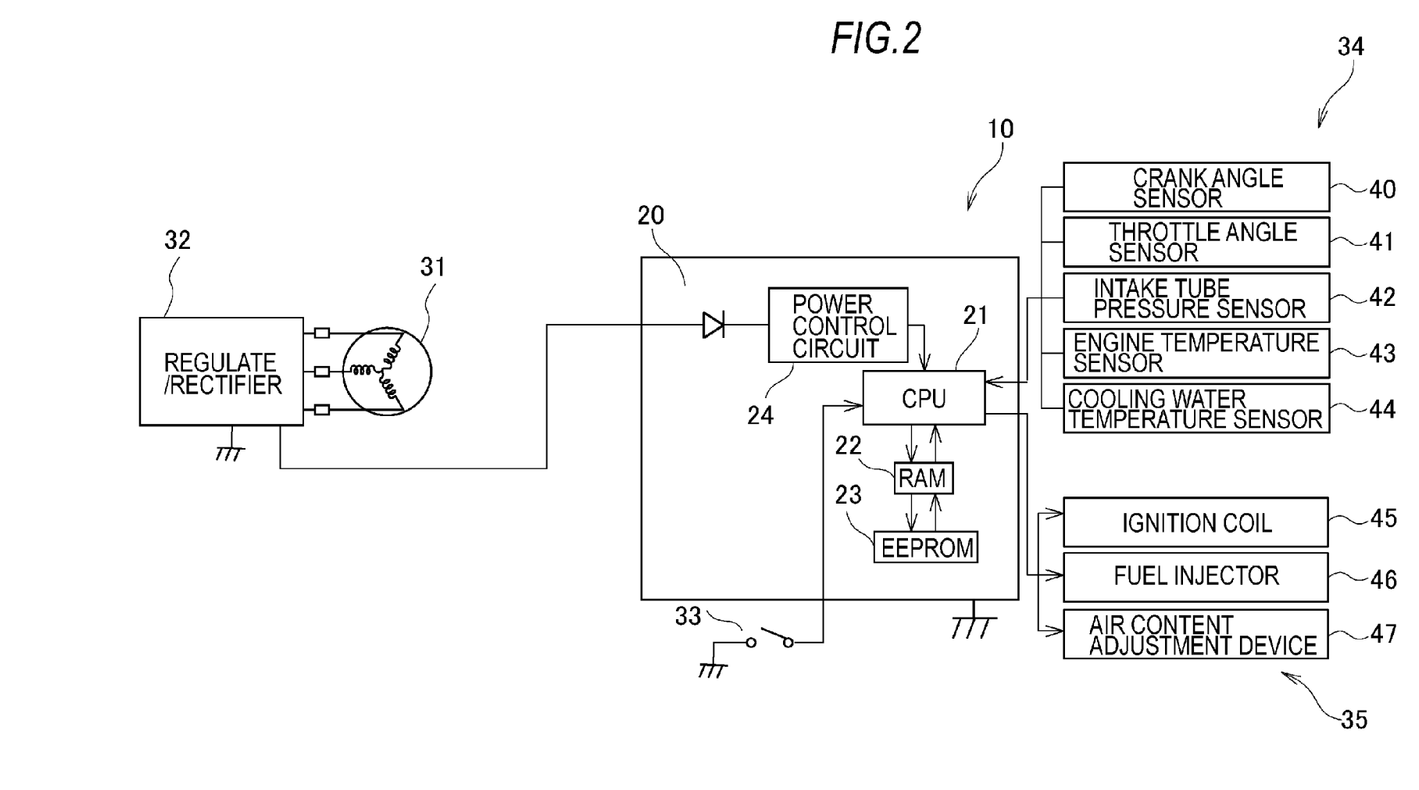
FIG. 2 is a block diagram illustrating an example of an internal configuration of the outboard motor according to the embodiment.

FIG. 2 is a block diagram illustrating an example of an internal configuration of the outboard motor 10. The outboard motor 10 includes an ECU 20, a power generator (a alternator) 31, a regulate rectifier 32, a stop switch 33, input equipments 34, output equipments 35, and so on.

The ECU 20 is a storage control device according to the present embodiment, and functions as a computer controlling various configuration components. The ECU 20 is constituted by including a CPU 21, a RAM 22, an EEPROM 23, a power control circuit 24, and so on.

The CPU 21 executes a program stored at the EEPROM 23, outputs a signal controlling the output equipments 35 based on a signal input from the input equipments 34, to thereby control the whole of the outboard motor 10. Besides, the CPU 21 performs a control to store later-described operation history information at the RAM 22 or the EEPROM 23.

The RAM 22 is a volatile memory, and is used as a work area of the CPU 21. The operation history information acquired by the CPU 21 is temporarily stored at the RAM 22.

The EEPROM 23 is a writable nonvolatile memory. A program to execute a later-described flowchart, information used by the CPU 21 when the output equipments 35 are controlled, and so on are stored at the EEPROM 23.

The power control circuit 24 controls the electric power generated by the power generator 31 to be a power supply necessary for driving the CPU 21 and supplies to the CPU 21.

The power generator 31 is directly or indirectly coupled to the crankshaft of the engine 13, and generates electricity in accordance with the rotation of the crankshaft.

The regulate rectifier 32 rectifies an alternating current generated by the power generator 31 into a direct current and controls a voltage to be a certain level or less.

The stop switch 33 is a switch operated by the boat operator when the driving of the engine 13 is to be stopped. The CPU 21 detects a stop instruction of the driving of the engine 13 via the stop switch 33. The stop switch 33 can double as an emergency switch. Note that the battery is not included, and therefore, an ignition switch is not included in the outboard motor 10 according to the present embodiment.

In the outboard motor 10 according to the present embodiment, a crank angle sensor 40, a throttle opening degree sensor 41, an intake tube pressure sensor 42, an engine temperature sensor 43, a cooling water temperature sensor 44, and so on are included as the input equipments 34. Besides, an ignition coil 45, a fuel injector 46, an air content adjustment device (ISC) 47, and so on are included as the output equipments 35. The outboard motor 10 according to the present embodiment applies an electronic control fuel injection system in which the output equipments 35 (the ignition coil 45, the fuel injector 46) are controlled based on the signal output by the input equipments 34, and thereby, it is possible to perform an optimum control of an ignition timing of fuel and an injection amount of the fuel.

The crank angle sensor 40 is disposed in close vicinity to the crankshaft, and outputs a signal at a predetermined crank angle. The CPU 21 counts a signal output from the crank angle sensor 40, and thereby, it is possible to detect an engine rotation speed.

The throttle opening degree sensor 41 is disposed in close vicinity to a throttle valve disposed at the intake tube. The throttle opening degree sensor 41 outputs a signal in accordance with an opening degree of the throttle valve changing in accordance with an operation of the throttle grip 18 by the boat operator.

The intake tube pressure sensor 42 is disposed at the intake tube, and outputs a signal of an intake tube pressure.

The engine temperature sensor 43 outputs a signal of a temperature of the engine 13.

The cooling water temperature sensor 44 outputs a signal of a temperature of cooling water.

The ignition coil 45 amplifies a voltage generated by the power generator 31 into a voltage necessary for ignition of an ignition plug. The CPU 21 indicates a timing amplifying the voltage for the ignition coil 45 based on the signal output by various input equipments 34 and so on.

The fuel injector 46 injects the fuel to the intake tube to thereby generate an air-fuel mixture. The CPU 21 indicates an injection amount injecting the fuel for the fuel injector 46 based on the signal output by the various input equipments 34 and so on.

The air content adjustment device 47 adjusts an air content flowing into the intake tube, and controls the engine rotation speed at an idling time and so on. The CPU 21 indicates an air content to be flowed into for the air content adjustment device 47 based on a signal output by the various input equipments 34 and so on.

As stated above, the outboard motor 10 according to the present embodiment is the batteryless outboard motor, and it is impossible to supply the electric power to the CPU 21, and to write the operation history information to the EEPROM 23 after the engine 13 is stopped.

Accordingly, in the present embodiment, it is controlled such that the operation history information is written to the EEPROM 23 before the driving of the engine 13 is stopped, and the engine 13 is stopped after the writing is finished when the stop instruction of the driving of the engine 13 is issued by the boat operator. The engine 13 is stopped after the CPU 21 writes the operation history information to the EEPROM 23, and thereby, it is possible for the CPU 21 to surely write the operation history information to the EEPROM 23 by using the electric power generated by the driving of the engine 13 under a stable state.

Figure 3:
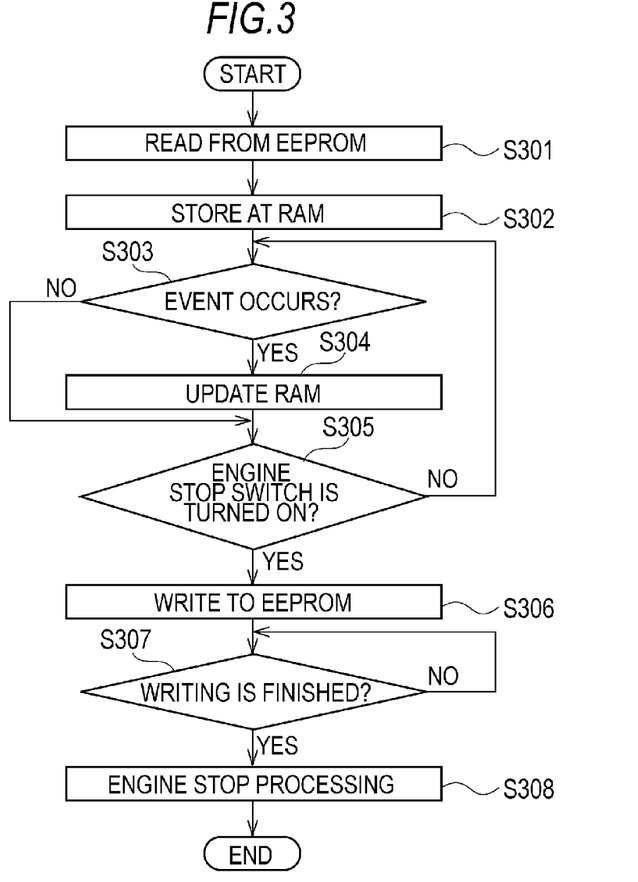
FIG. 3 is a flowchart illustrating processes storing operation history information at a nonvolatile memory according to the embodiment.

Hereinafter, processes performed by the CPU 21 of the ECU 20 in the present embodiment are described with reference to FIG. 3. FIG. 3 is a flowchart illustrating processes in which the CPU 21 stores the operation history information to the EEPROM 23.

The flowchart illustrated in FIG. 3 is enabled by the CPU 21 deploying the program stored at the EEPROM 23 on the RAM 22 and executing the program. Besides, the flowchart illustrated in FIG. 3 is executed by, for example, the boat operator driving the engine 13 by performing the pulling operation of the starter knob 19.

At first, in step S301, the CPU 21 reads the operation history information already stored at the EEPROM 23. Note that the operation history information to be read here is past operation history information, and the operation history information is not stored at the EEPROM 23 when the outboard motor 10 is driven for the first time.

Information of the engine rotation speed, the engine temperature, the cooling water temperature, the intake tube pressure, and so on acquired by the CPU 21 from the various input equipments 34, warning information and failure information judged based on the above-stated information are included as the operation history information. Besides, information which is calculation processed by the CPU 21 may be included as the operation history information without being limited to the above-stated information. For example, the engine rotation speed and the intake tube pressure are each divided into regions of plural ranges in advance, the CPU 21 judges that the engine 13 is operated at the engine rotation speed of any of the regions and the intake tube pressure at any of the regions, and information of an operation time and so on measured by each combination of the engine rotation speed at a predetermined region and the intake tube pressure at a predetermined region are also included in the operation history information.

In step S302, the CPU 21 stores the operation history information read from the EEPROM 23 to the RAM 22.

In step S303, the CPU 21 judges whether or not an event occurs. When the event occurs, the process goes to step S304, and when the event does not occur, the process goes to step S305. Here, the event means the warning or the failure judged by the CPU 21 based on the information such as the engine rotation speed, the engine temperature, the cooling water temperature, the intake tube pressure acquired by the above-stated input equipments 34. Note that the process is able to go to the step S304 by every predetermined time defined in advance without being limited to the case when the event occurs.

In the step S304, the CPU 21 updates the operation history information stored at the RAM 22. Namely, the CPU 21 updates the operation history information by additionally storing the information of the engine rotation speed, the engine temperature, the cooling water temperature, the intake tube pressure, the operation time, and so on in addition to the acquired warning information and failure information at the RAM 22. This process corresponds to an example of a process by a storage processing means.

In step S305, the CPU 21 judges whether or not the stop instruction of the driving of the engine 13 by the boat operator is detected, then the process goes to step S306 when it is detected, and the process returns to the step S303 when it is not detected. Specifically, the CPU 21 detects the stop instruction of the driving of the engine 13 by the boat operator based on a signal from the stop switch 33. This process corresponds to an example of a process by a stop instruction detecting means.

In step S306, the CPU 21 writes the operation history information stored at the RAM 22 to the EEPROM 23. This process corresponds to an example of a process by a writing means. At this time, the engine 13 is not stopped, and the electric power is supplied from the power generator 31 to the CPU 21, and therefore, the CPU 21 is able to perform the process writing the operation history information to the EEPROM 23.

In step S307, the CPU 21 judges whether or not the process writing the operation history information to the EEPROM 23 is finished, and the process goes to step S308 when it is finished. For example, the CPU 21 judges whether or not the operation history information stored at the RAM 22 is identical with the operation history information written to the EEPROM 23, and thereby, it is possible to judge whether or not the process writing the operation history information to the EEPROM 23 is finished. This process corresponds to an example of a process by a write judgment means.

In the step S308, the CPU 21 stops the driving of the engine 13 to thereby complete the process storing the operation history information. Here, the CPU 21 stops the instruction for the ignition coil 45, and thereby, it is possible to stop the driving of the engine 13. This process corresponds to an example of a process by a stop processing means.

Figure 4:
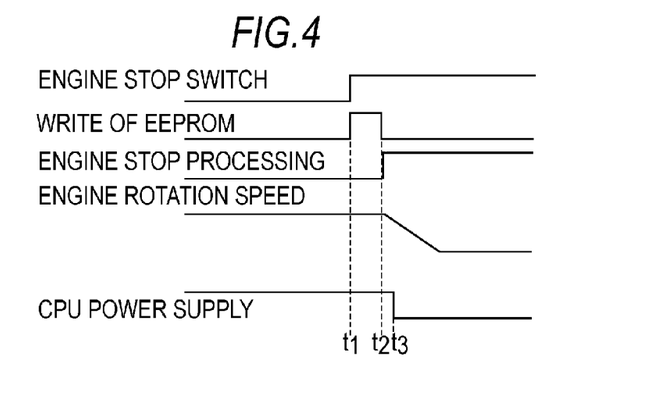
FIG. 4 is a view illustrating a timing storing the operation history information to the nonvolatile memory according to the embodiment.

Next, the timing when the CPU 21 stores the operation history information at the EEPROM 23 is described with reference to FIG. 4. The timings illustrated in FIG. 4 correspond to the processes from the step S305 to the step S308 in the flowchart in FIG. 3.

At first, at time t1, the writing of the EEPROM 23 is started in accordance with the signal of the stop switch 33 of the engine 13 (the step S305 and the step S306).

Next, at a time t2, the process stopping the driving of the engine 13 is started by finishing the writing of the EEPROM 23 (the step S307 and the step S308). Accordingly, the engine rotation speed of the engine 13 is gradually lowered from the time t2 as illustrated in FIG. 4. Namely, as illustrated in FIG. 4, the electric power necessary for the operation of the CPU 21 is supplied at least until the time t2, and therefore, it is possible for the CPU 21 to stably and surely perform the process writing the operation history information to the EEPROM 23.

As stated above, according to the present embodiment, the engine 13 is stopped after the operation history information is stored at the EEPROM 23 when the stop instruction of the engine 13 is detected. Accordingly, the CPU 21 operates by the electric power generated by the driving of the engine 13 during a period when the operation history information is stored at the EEPROM 23, and therefore, it is possible to stably and surely store the operation history information until just before the engine 13 is stopped at the EEPROM 23 without any leavings even in the batteryless outboard motor.

Besides, according to the present embodiment, the operation history information stored at the RAM 22 is collectively written to the EEPROM 23 when the stop instruction of the engine 13 is detected, and thereby, it is possible to suppress the number of writing times of the EEPROM 23, and to secure the reliability of the EEPROM 23.

Besides, according to the present embodiment, it is not necessary to newly add a capacitor and so on to secure the power supply after the engine 13 is stopped, and therefore, it is possible to reduce the cost and to improve flexibility of layout of the outboard motor 10.

Hereinabove, the present invention is described by embodiments, but the present invention is not limited to the above-stated embodiments, and modifications and so on are possible within a scope of the present invention.

For example, the case when the batteryless outboard motor which does not include the battery is used is described in the above-stated embodiment, but the embodiment is able to be applied to an outboard motor including the battery without being limited to the above. Namely, when the present embodiment is applied to the outboard motor including the battery, it is possible to store the operation history information at the nonvolatile memory even when filing failure of the battery occurs.

Besides, the case when the EEPROM is used as the nonvolatile memory is described in the above-stated embodiment, but it is not limited thereto. It may be any writable nonvolatile memory, and for example, it may be a flash memory and so on.

Besides, in the present embodiment, the case is described when the CPU 21 performs the above-stated processes by executing the program, but it is not limited thereto. Each circuit constituted by hardware may perform the above-stated processes.

According to the present embodiment, it is possible to stably and surely store operation history information to a nonvolatile memory even when an engine stop instruction is issued.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A storage control device of a batteryless outboard motor writing operation history information of the batteryless outboard motor which does not include a battery and operates by using only electric power generated by driving of an internal combustion engine to a nonvolatile memory, the storage control device comprising:
    a stop instruction detecting unit detecting a stop instruction of the driving of the internal combustion engine by a boat operator;
    a writing unit writing the operation history information to the nonvolatile memory in accordance with the stop instruction detected by the stop instruction detecting unit before the driving of the internal combustion engine is stopped;
    a write judgment unit judging whether or not writing the operation history information to the nonvolatile memory by the writing unit is completed; and
    a stop processing unit stopping the driving of the internal combustion engine based on the stop instruction detected by the stop instruction detecting unit,
    wherein the stop processing unit continues the driving of the internal combustion engine for a period of time between when the stop instruction is detected by the stop instruction detecting unit and completion of the writing the operation history information to the nonvolatile memory by the writing unit is judged by the write judgment unit and after that, stops the driving of the internal combustion engine.

2. The storage control device according to claim 1, further comprising:
a storage processing unit storing the operation history information of the batteryless outboard motor at a volatile memory,
wherein the writing unit writes the operation history information stored at the volatile memory by the storage processing unit to the nonvolatile memory.

3. A storage control method of a batteryless outboard motor writing operation history information of the batteryless outboard motor which does not include a battery and operates by using only electric power generated by driving of an internal combustion engine to a nonvolatile memory, the storage control method comprising:
a stop instruction detecting step of detecting a stop instruction of the driving of the internal combustion engine by a boat operator;
a writing step of writing the operation history information to the nonvolatile memory in accordance with the stop instruction detected by the stop instruction detecting step before stopping the driving of the internal combustion engine;
a write judgment step of judging whether or not writing the operation history information to the nonvolatile memory is completed by the writing step;
a stop processing step of stopping the driving of the internal combustion engine based on the stop instruction detected by the stop instruction detecting step; and
continuing driving the internal combustion engine for a period of time between the detection of the stop instruction and completion of the writing of the operation history information to the nonvolatile memory from the writing step, and after that, stopping the driving of the internal combustion engine.

4. The storage control device according to claim 2, wherein the write judgment unit judges whether or not a process writing the operation history information to the nonvolatile memory is finished by judging whether or not the operation history information written to a volatile memory is identical with the operation history information written to the nonvolatile memory.

5. A batteryless outboard motor, comprising:
a storage control device writing operation history information of the batteryless outboard motor which does not include a battery and operates by using only an electric power generated by driving of an internal combustion engine to a nonvolatile memory,
wherein the storage control device includes:
a stop instruction detecting unit detecting a stop instruction of the driving of the internal combustion engine by a boat operator;
a writing unit writing the operation history information to the nonvolatile memory in accordance with the stop instruction detected by the stop instruction detecting unit before the driving of the internal combustion engine is stopped;
a write judgment unit judging whether or not the operation history information is written to the nonvolatile memory by the writing unit; and
a stop processing unit stopping the driving of the internal combustion engine based on the stop instruction detected by the stop instruction detecting unit,
wherein the stop processing unit continues the driving of the internal combustion engine in a period of time between the stop instruction is detected by the stop instruction detecting unit and finish of writing the operation history information to the nonvolatile memory by the writing unit is judged by the write judgment unit, and after that, stops the driving of the internal combustion engine,
wherein an engine rotation speed of the internal combustion engine is the same at a time before the stop instruction is detected by the stop instruction detecting unit and in the period of time between the stop instruction is detected by the stop instruction detecting unit and the writing the operation history information to the nonvolatile memory by the writing unit is finished, and
the engine rotation speed is gradually lowered and then stopped after the writing the operation history information to the nonvolatile memory by the writing unit is finished.

* * * * *